United States Patent
Mansbridge

(10) Patent No.: US 7,006,766 B2
(45) Date of Patent: Feb. 28, 2006

(54) DEMULTIPLEXER CONTROL SYSTEM

(75) Inventor: John Mansbridge, Eastleigh (GB)

(73) Assignee: Roke Manor Research Limited, Romsey (GB)

(*) Notice: Subject to any disclaimer, the term of this patent is extended or adjusted under 35 U.S.C. 154(b) by 813 days.

(21) Appl. No.: 09/842,207

(22) Filed: Apr. 26, 2001

(65) Prior Publication Data
US 2002/0008890 A1    Jan. 24, 2002

(30) Foreign Application Priority Data
Apr. 28, 2000 (GB) ................................... 0010316

(51) Int. Cl.
*H04J 14/00* (2006.01)

(52) U.S. Cl. .............................. 398/43; 398/45; 398/51; 398/54; 398/164; 370/218; 370/395.1; 710/68

(58) Field of Classification Search .................. 398/43, 398/45, 49, 57, 54, 53, 77, 98, 79, 102, 164, 398/198; 370/218, 468, 535, 537, 542; 710/68
See application file for complete search history.

(56) References Cited

U.S. PATENT DOCUMENTS 5,099,471 A * 3/1992 Tsukada et al. ............... 398/98

FOREIGN PATENT DOCUMENTS

| EP | 0849906 | 6/1998 |
| EP | 0892516 | 1/1999 |

* cited by examiner

*Primary Examiner*—Kinfe-Michael Negash
(74) *Attorney, Agent, or Firm*—Crowell & Moring LLP

(57) ABSTRACT

A system for controlling the demultiplexing process in an optical backplane device has application to optical switching in high-speed digital communication routers and switches. In demultiplexing, a selected compressed data packet is extracted from a multiplexed stream of compressed packets by a modulator and decompressed. The modulator is controlled by a control signal. An error in the timing of the modulator control signal corresponds to a characteristic distortion in the decompressed signal. By monitoring the effect of timing errors on decompressed signals, steps can be taken to correct the timing errors by controlling delays in either the optical or the electronic parts of the switching device. The timing of modulator control pulses is thus continuously adjusted to minimize timing errors. Instead of monitoring just decompressed signals, calibration pulse trains of known value and suitable form can be inserted.

7 Claims, 4 Drawing Sheets

DEMULTIPLEXER CONTROL SYSTEM

BACKGROUND OF THE INVENTION

This application claims the priority of British patent document 0010316.8, filed 28 Apr. 2000, the disclosure of which is expressly incorporated by reference herein.

The present invention relates to a demultiplexer control system. In particular, the present invention relates to a control system to enable the control of the demultiplexing process associated with an optical backplane.

The invention has application in the development of new architectures for optical switching applied to high-speed digital communication routers/switches.

UK Patent Application No. 9930163.2—"Data Compression Apparatus and Method Therefor" describes the operation of an optical backplane, for example an optical fiber, in an optical switching system. The operation includes a method for converting packets of data at 10 Gbits/s to packets at 1.28 Tbits/s. In the next step after data compression, the compressed packets are time multiplexed onto the optical backplane of a switching device, for example an IP router or ATM switch. The process of selecting a given compressed packet, from the stream of multiplexed packets on the backplane, is termed demultiplexing the packet.

The operation of an optical switching device wherein pulse trains are time multiplexed on an optical backplane is shown in FIG. 4. A laser generates (step 400) a pulse having a duration corresponding to the length of an input packet of data and a linear chirp, i.e. the frequency of the light increases (or decreases) with time during the pulse. Packets of data corresponding to the input data are received (step 402) by input receiver transducers. The data received is buffered (step 404). The buffered data is then transferred to a modulator controller for modulation (step 406) by a modulator.

A modulated data signal from the modulator is then compressed (step 408) by a compressor. In the case of compressed data pulses corresponding to subsequent input data, a delay is introduced (step 410) to facilitate multiplexing of compressed data pulses. Modulated data signals are combined (step 412) and form a multiplexed compressed modulated pulse train. The combined multiplexed pulse train is carried by an optical backplane then split and sent to at least one modulator where it is demultiplexed (step 414).

The demultiplexed, compressed packet is decompressed once it has passed through the modulator (step 416). The resulting decompressed packet is converted from an optical signal to an electrical signal.

The decompressed, demultiplexed packet is received by output receiver transducers (step 418). The output receiver transducers convert the optical signals received to 10 Gbits/s electrical signals. The signals generated by the output receiver transducers are buffered (step 420) before they are forwarded to output transmitter transducers. Finally, the output transmitter transducers convert the received electrical signal to a 10 Gbits/s optical signal for further transmission (step 422).

Demultiplexing (step 414) is carried out by supplying the multiplexed pulse train of compressed packets to a modulator that is normally in an 'off' state. The modulator attenuates, deflects or otherwise blocks the packets whilst in the 'off' state. The modulator is arranged to be switched to an 'on' state when the required compressed packet arrives, thus allowing the selected compressed packet to pass through the modulator.

In the systems of relevance to IP routers, the modulator is typically in an 'on' state for 50 picoseconds (ps). If the time when the modulator is turned 'on' does not match the arrival of a compressed packet, part of the compressed packet will be lost and the detected signal will be in error. The timing error has only to be of the order of ten picoseconds to degrade the performance of the switch. Timing errors of this order are common in electrical and optical systems as a result of temperature and other physical changes. In order to ensure that the switch continues to operate effectively, the relative timing of the modulator control signal and the compressed packet must be monitored and periodically adjusted to keep them in their correct relationship.

One approach to achieving this monitoring would be to measure the control pulse and the peak of the compressed data packet and to compare them. This has a number of disadvantages. Firstly, the compressed data packet signal needs to be measured with a very high bandwidth (many tens of gigaHertz (GHz)), which is costly, high in power consumption (therefore heat generating) and difficult to implement.

Secondly, errors on the comparison process are as difficult to avoid as errors in the modulator timing.

Thus there is a need for a technique which enables the timing to be monitored and adjusted without having to measure the signals with picosecond accuracy or bandwidths of many tens of gigaHertz.

SUMMARY OF THE INVENTION

It is therefore an object of the invention to obviate or at least mitigate the aforementioned problems.

In accordance with one aspect of the present invention, there is provided a system for controlling the demultiplexing process in an optical backplane device, the optical backplane device including: a modulator means, which is controlled by a modulator control signal and which extracts a selected compressed data packet from a multiplexed stream of compressed packets; a monitoring means, wherein the effect of timing errors on decompressed signals is monitored; and a control signal adjusting means, wherein the timing errors are corrected by adjusting the timing of the modulator control signal.

Preferably, the timing of modulator control signal is continuously adjusted to minimize timing errors.

The timing of the modulator control signal is preferably advanced if the trailing edge of a given decompressed pulse train is reduced more than the leading edge of said decompressed pulse train and delayed if the leading edge of the given decompressed pulse train is reduced more than the trailing edge of said decompressed pulse train.

Advantageously, both the delay and the advance are proportional to the difference in reduction between the leading and trailing edges.

Preferably, the timing of the modulator control signal makes use of calibration pulse trains of known value and suitable form to adjust the timing of modulator control pulses.

The timing of the modulator control signal may make use of a calibration pulse train consisting of binary 'ones' only. Alternatively, the timing of the modulator control signal may make use of a calibration pulse train consisting of a finite repeating sequence of binary 'one' followed by binary 'zero'.

Other objects, advantages and novel features of the present invention will become apparent from the following detailed description of the invention when considered in conjunction with the accompanying drawings.

DETAILED DESCRIPTION OF THE INVENTION

Figure 1:
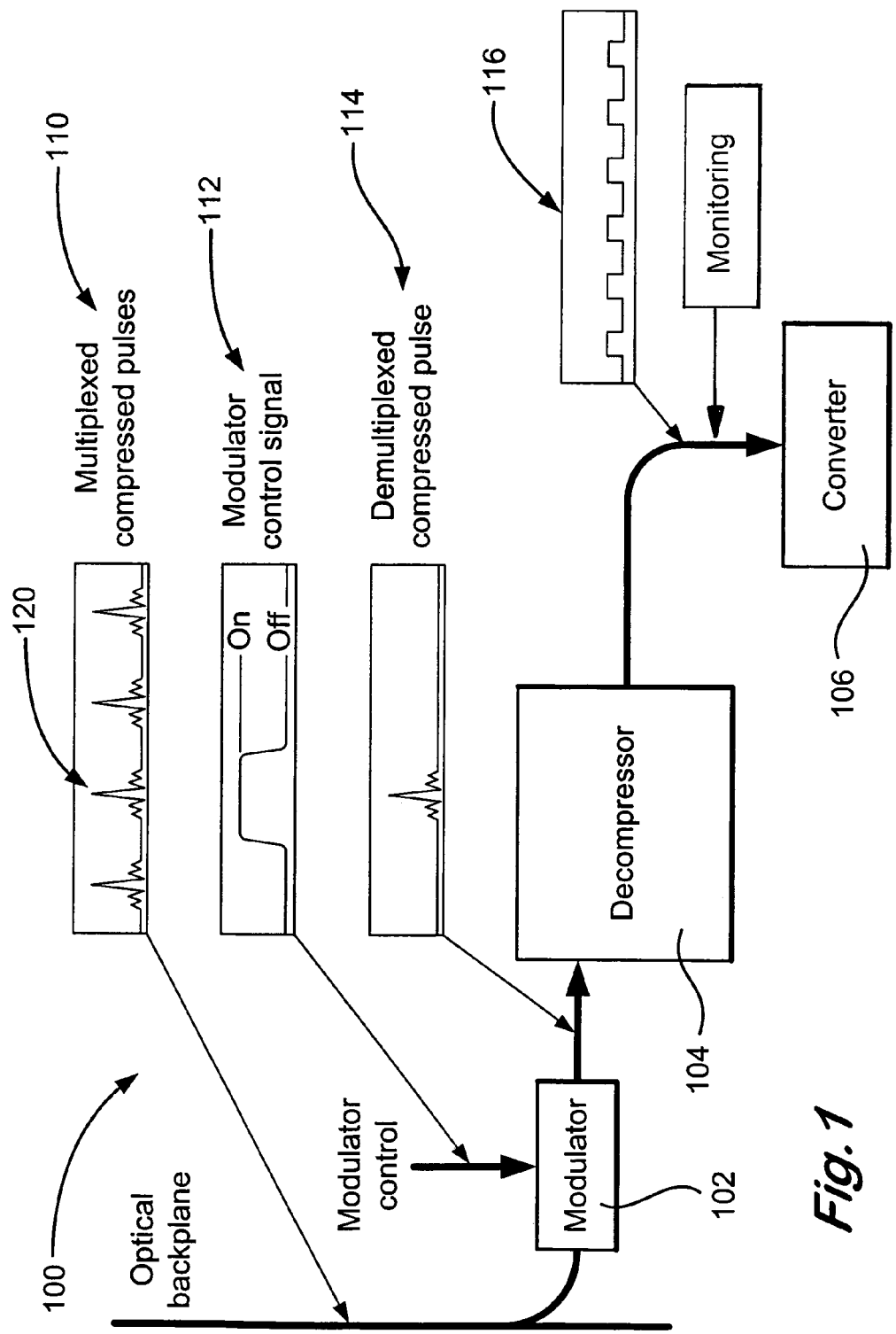
FIG. 1 shows a schematic diagram of the demultiplexing process.

FIG. 1 shows how demultiplexing is carried out by supplying the stream of multiplexed compressed packets 110 to a modulator 102 that is normally in an 'off' state. The modulator 102 attenuates, deflects or otherwise blocks the packets 110 whilst in the 'off' state. The modulator 102 is arranged to be switched to an 'on' state by a modulator control signal 112 when the required compressed packet 120 arrives, thus allowing the selected compressed packet 120 to pass through the modulator 102. The selected compressed packet 120 is decompressed 104 after passing through the modulator 102. The resulting decompressed packet 116 is converted from an optical signal to an electrical signal by a converter 106: in other words the decompressed packet 116 is 'detected'.

When a signal is less than completely compressed, an error in the timing of the modulator control signal can be arranged so that the decompressed signal is distorted in a specific way. The effect of timing errors in the demultiplexer control signal when incomplete compression is implemented, is illustrated in FIG. 2.

Figure 2:
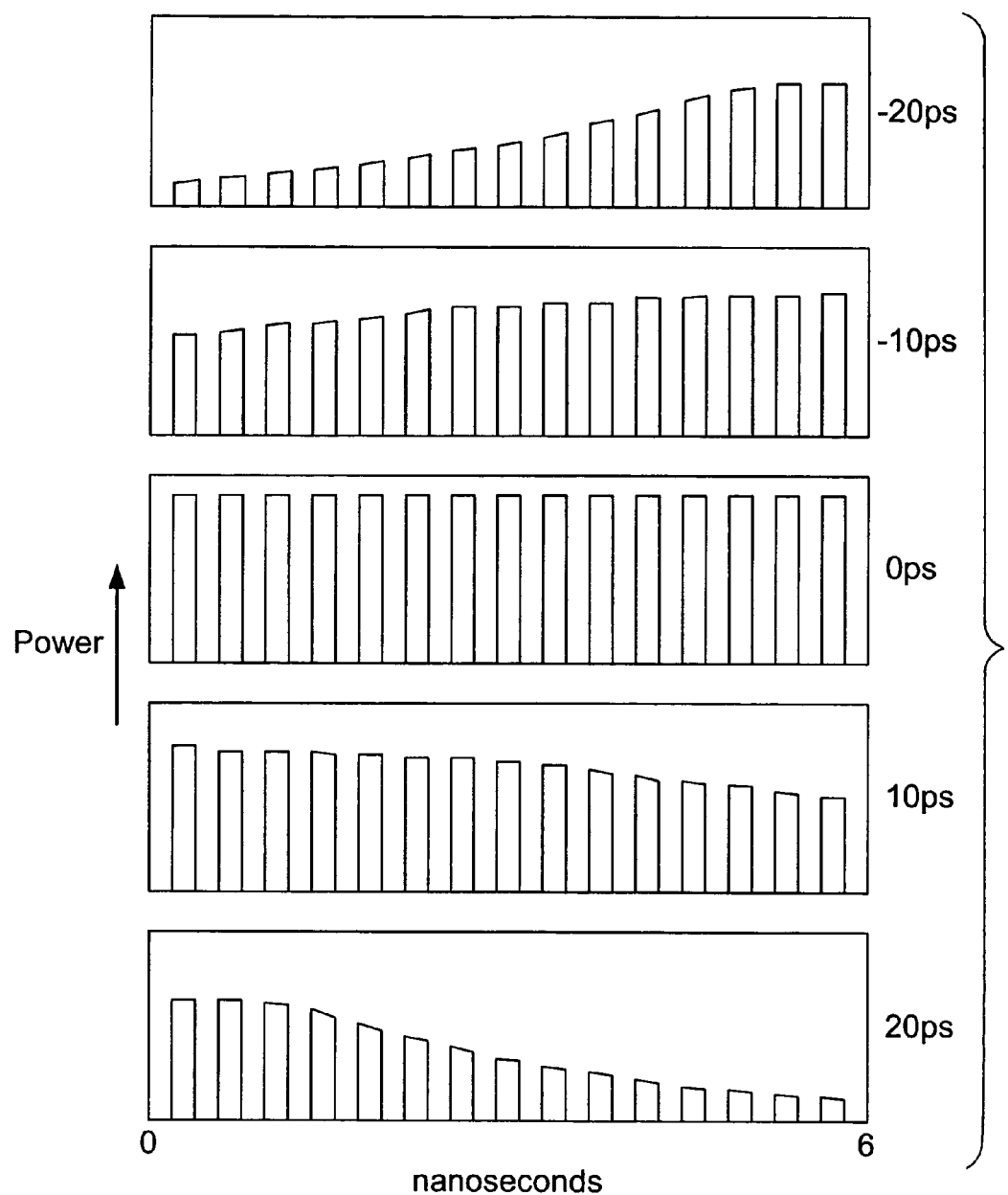
FIG. 2 illustrates the distorting effect of demultiplexer timing error on a decompressed signal.

FIG. 2 shows the effect on the decompressed signal of the timing error at timing errors of −20 ps, −10 ps, zero error, +10 ps and +20 ps. It can be seen that if the timing error is negative the leading edge of the decompressed pulse train is reduced more than the other end, whereas if the timing error is positive the trailing edge is reduced more.

The timing error effect gives an unambiguous indication of the direction and amount of the timing error and by controlling delays in either the optical or electronic parts of the system, the error can then be corrected for. Thus the distortion can be continuously monitored and the timing adjusted continuously to minimize the timing drifts due to phenomena including temperature, aging and mechanical effects.

One method for arranging a suitable distortion is to make the compressor an imperfect match to the laser chirp. Crucially, therefore, the signal is not compressed to its full extent. The signal being compressed to a lesser extent is, in any case, desirable to reduce the peak power in the compressed signal. It should be remarked that a small degree of incomplete compression has little effect on the performance of the system.

The distortion can be monitored by looking at the signal level of the data pulses along the length of the decompressed pulse. If the data is non-return to zero (NRZ) this process would have to be averaged over a number of decompressed pulse trains, since in any given pulse train there may be no pulses to measure, at either one or both end portions of the pulse train. Thus it is advantageous to use specially inserted, calibration pulse trains that consist of a known and suitable set of pulses. Use of calibration pulse trains has a cost because it reduces the transmission bandwidth available to other functions of the system. However, if the uncorrected timing error changes very much more slowly than the data rate then this loss of capacity will not be significant.

Figure 3:
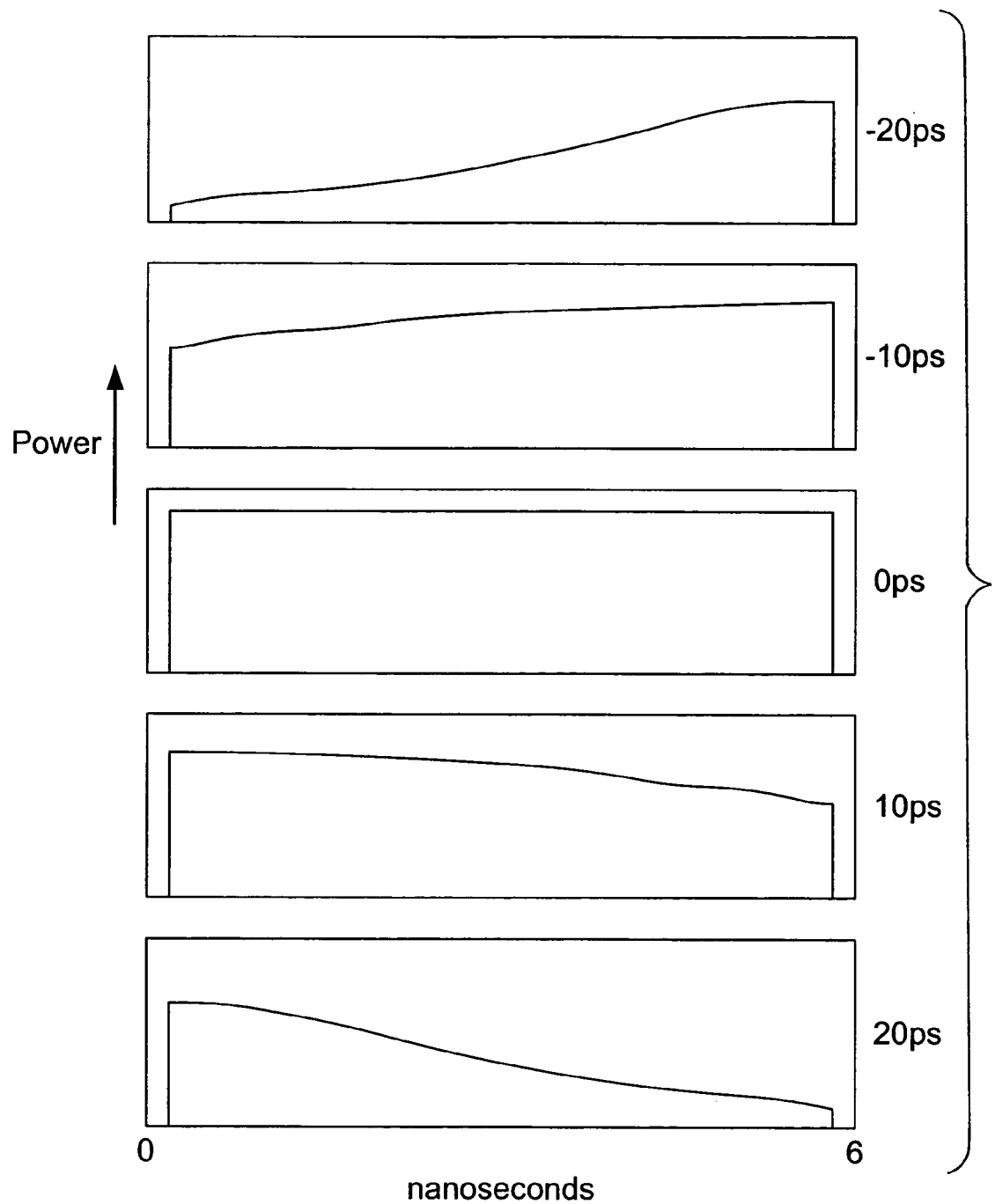
FIG. 3 illustrates the distorting effect of demultiplexer timing error on a calibration pulse train of all 'ones' as may be used in the present invention.
Figure 4:
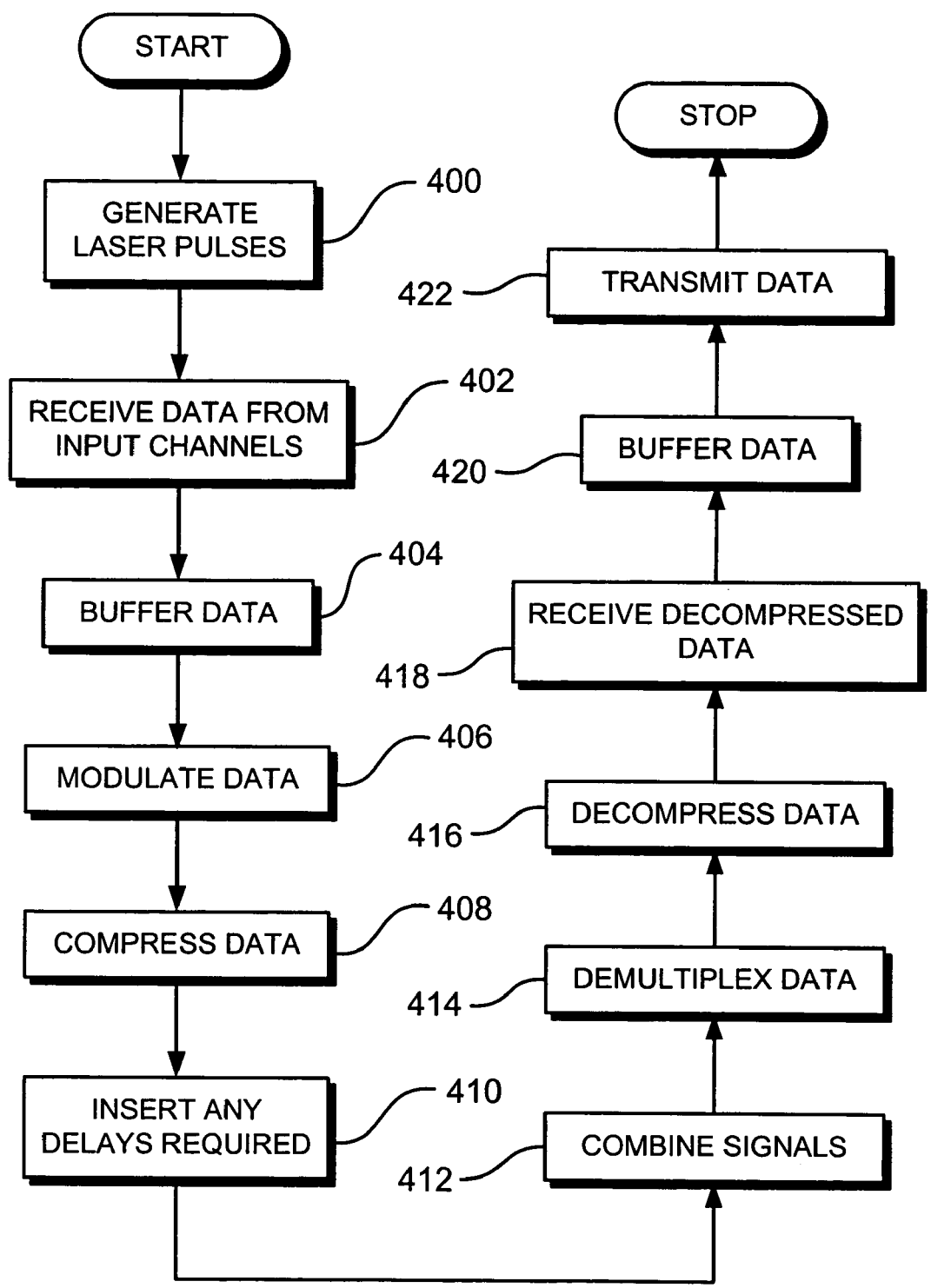
FIG. 4 shows a schematic diagram of the operation of an optical switching devices using time multiplexing of pulse trains on an optical backplane as disclosed in UK Patent Application No. 9930163.2.

The use of a calibration pulse train is illustrated in FIG. 3. In this case, the calibration pulse is all 'ones' and it can be seen that monitoring of the distortion is straightforward.

Similarly, a calibration pulse train of alternating 'ones' and 'zeros' can be adopted. Again the distortion introduced by timing errors can be monitored in a simple manner.

If a calibration pulse train is not used, then the data in the pulse train will need to be taken into account when assessing the distortion. This can be done but involves considerably a monitoring means of considerably more complexity.

It will be understood that the monitoring of distortion need not involve making measurements of the pulse height at the full data bandwidth. The measurement system is therefore made much easier and less costly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for controlling a demultiplexing process in an optical backplane device having a modulator means, which is controlled by a modulator control signal, for extracting a selected compressed data packet from a multiplexed stream of compressed packets, and a decompressor means for generating decompressed pulse trains corresponding to said selected compressed data packets, said apparatus comprising:

a monitoring means for monitoring the effect of timing errors in said modulator control signal on said decompressed pulse trains, each decompressed pulse train having a leading edge and a trailing edge; and a control signal adjusting means for correcting said timing errors by adjusting the timing of the modulator control signal.

2. A system as claimed in claim 1, wherein the timing of the modulator control signal is continuously adjusted to minimize timing errors.

3. A system as claimed in claim 1, wherein the timing of the modulator control signal is advanced if the trailing edge of a given decompressed pulse train is reduced more than the leading edge of said decompressed pulse train and delayed if the leading edge of the given decompressed pulse train is reduced more than the trailing edge of said decompressed pulse train.

4. A system as claimed in claim 3, wherein both the delay and the advance are proportional to the difference in reduction between the leading and trailing edges.

5. A system as claimed in claim 1, wherein the timing of the modulator control signal makes use of calibration pulse trains of known value and suitable form to adjust the timing of modulator control pulses.

6. A system as claimed in claim 5, wherein the timing of the modulator control signal makes use of a calibratin pulse train consisting of binary 'ones' only.

7. A system as claimed in claim 5, wherein the timing of the modulator control signal makes use of a calibration pulse train consisting of a finite repeating sequence of binary 'one' followed by binary 'zero'.

* * * * *